United States Patent
Baltas et al.

(10) Patent No.: US 10,371,001 B2
(45) Date of Patent: Aug. 6, 2019

(54) VARIABLE FAN NOZZLE USING SHAPE MEMORY MATERIAL

(71) Applicant: UNITED TECHNOLOGIES CORPORATION, Hartford, CT (US)

(72) Inventors: Constantine Baltas, Avon, CT (US); Amr Ali, South Windsor, CT (US)

(73) Assignee: United Technologies Corporation, Farmington, CT (US)

(*) Notice: Subject to any disclaimer, the term of this patent is extended or adjusted under 35 U.S.C. 154(b) by 584 days.

(21) Appl. No.: 15/008,508

(22) Filed: Jan. 28, 2016

(65) Prior Publication Data

US 2016/0138416 A1 May 19, 2016

Related U.S. Application Data

(63) Continuation of application No. 12/442,547, filed as application No. PCT/US2006/040067 on Oct. 12, 2006, now Pat. No. 9,328,695.

(51) Int. Cl.
*F02K 1/46* (2006.01)
*F02K 1/48* (2006.01)
(Continued)

(52) U.S. Cl.
CPC ............... *F01D 17/14* (2013.01); *F01D 5/02* (2013.01); *F01D 9/02* (2013.01); *F01D 17/105* (2013.01); *F01D 25/24* (2013.01); *F02C 3/04* (2013.01); *F02K 1/08* (2013.01); *F02K 1/085* (2013.01); *F02K 1/386* (2013.01); *F02K 3/075* (2013.01);
(Continued)

(58) Field of Classification Search
CPC ..... F02K 1/04; F02K 1/06; F02K 1/08; F02K 1/085; F02K 1/09; F02K 1/386; F02K 1/46; F02K 1/48; F01D 25/24; F01D 17/14
See application file for complete search history.

(56) References Cited

U.S. PATENT DOCUMENTS 3,648,800 A * 3/1972 Hoerst ............... F02K 1/46
  181/213
4,933,027 A * 6/1990 Moriya ............... C22C 38/34
  148/402
(Continued)

FOREIGN PATENT DOCUMENTS

EP  1612416 A1  1/2006

OTHER PUBLICATIONS

Search Report and Written Opinion dated Nov. 28, 2007 for PCT/US2006/040067.
(Continued)

*Primary Examiner* — Todd E Manahan
*Assistant Examiner* — Eric W Linderman
(74) *Attorney, Agent, or Firm* — Carlson, Gaskey & Olds, P.C.

(57) ABSTRACT

A gas turbine engine includes a fan, a nacelle arranged about the fan, and an engine core at least partially within the nacelle. A fan bypass passage downstream of the fan between the nacelle and the gas turbine engine conveys a bypass airflow from the fan. A nozzle associated with the fan bypass passage is operative to control the bypass airflow. The nozzle includes a shape memory material having a first solid state phase that corresponds to a first nozzle position and a second solid state phase that corresponds to a second nozzle position.

2 Claims, 2 Drawing Sheets

(51) Int. Cl.

| | | |
|---|---|---|
| *F02K 1/38* | (2006.01) | |
| *F01D 17/14* | (2006.01) | |
| *F02K 1/08* | (2006.01) | |
| *F02K 3/075* | (2006.01) | |
| *F03G 7/06* | (2006.01) | |
| *F01D 5/02* | (2006.01) | |
| *F01D 9/02* | (2006.01) | |
| *F01D 17/10* | (2006.01) | |
| *F01D 25/24* | (2006.01) | |
| *F02C 3/04* | (2006.01) | |
| *B64C 9/38* | (2006.01) | |
| *F02K 1/12* | (2006.01) | |
| *F02K 3/00* | (2006.01) | |
| *F02K 3/04* | (2006.01) | |
| *F02K 3/06* | (2006.01) | |

(52) U.S. Cl.
CPC ............... *F03G 7/065* (2013.01); *B64C 9/38* (2013.01); *F02K 1/12* (2013.01); *F02K 1/1207* (2013.01); *F02K 1/46* (2013.01); *F02K 1/48* (2013.01); *F02K 3/00* (2013.01); *F02K 3/04* (2013.01); *F02K 3/06* (2013.01); *F05D 2220/36* (2013.01); *F05D 2240/128* (2013.01); *F05D 2240/24* (2013.01); *F05D 2240/35* (2013.01); *F05D 2260/606* (2013.01); *F05D 2300/174* (2013.01); *F05D 2300/177* (2013.01); *F05D 2300/505* (2013.01)

(56) References Cited

U.S. PATENT DOCUMENTS

| | | | | |
|---|---|---|---|---|
| 5,662,294 A * | 9/1997 | Maclean | ............... | B63B 1/28 114/140 |
| 6,015,263 A * | 1/2000 | Morris | ............... | F04D 29/388 415/1 |
| 6,182,929 B1 * | 2/2001 | Martin | ............... | B63B 1/248 244/219 |
| 6,220,550 B1 * | 4/2001 | McKillip, Jr. | ............... | B64C 13/50 114/144 R |
| 7,000,378 B2 | 2/2006 | Birch et al. | | |
| 7,093,423 B2 * | 8/2006 | Gowda | ............... | F02K 1/48 239/265.43 |
| 7,178,338 B2 * | 2/2007 | Whurr | ............... | F02K 1/08 239/265.19 |
| 7,216,831 B2 * | 5/2007 | Wood | ............... | F02K 1/1207 244/99.8 |
| 7,926,285 B2 * | 4/2011 | Tisdale | ............... | F02K 1/386 239/265.39 |
| 8,291,710 B2 * | 10/2012 | Webster | ............... | F02K 1/10 239/265.19 |
| 8,651,142 B2 * | 2/2014 | Sellers | ............... | F03G 7/065 137/468 |
| 9,581,145 B2 * | 2/2017 | Jasklowski | ............... | F02K 1/1207 |
| 9,617,953 B2 * | 4/2017 | Webster | ............... | F02K 1/386 |
| 9,919,505 B2 * | 3/2018 | Shome | ............... | B29C 70/54 |
| 2002/0073691 A1 | 6/2002 | Rey et al. | | |
| 2002/0125340 A1 * | 9/2002 | Birch | ............... | F02K 1/383 239/265.11 |
| 2002/0164249 A1 * | 11/2002 | Strange, Jr. | ............... | F02K 1/48 415/211.2 |
| 2003/0180567 A1 | 9/2003 | Dunne et al. | | |
| 2003/0221411 A1 * | 12/2003 | Nesbitt | ............... | F02K 1/46 60/204 |
| 2005/0229585 A1 * | 10/2005 | Webster | ............... | F02K 1/383 60/226.1 |
| 2006/0000211 A1 * | 1/2006 | Webster | ............... | F02K 1/383 60/527 |
| 2006/0101803 A1 * | 5/2006 | White | ............... | F02K 1/386 60/204 |
| 2006/0101807 A1 * | 5/2006 | Wood | ............... | B64C 7/02 60/262 |
| 2008/0163606 A1 * | 7/2008 | Cini | ............... | F02K 1/09 60/204 |
| 2009/0158704 A1 * | 6/2009 | Whurr | ............... | F02K 1/08 60/264 |
| 2009/0282679 A1 * | 11/2009 | Mons | ............... | F01D 5/085 29/889.2 |
| 2009/0297338 A1 * | 12/2009 | Lord | ............... | F02K 1/16 415/145 |
| 2010/0037588 A1 * | 2/2010 | Baltas | ............... | F02K 1/08 60/226.3 |
| 2010/0139240 A1 * | 6/2010 | Levasseur | ............... | F02K 1/085 60/204 |
| 2010/0163250 A1 * | 7/2010 | Schultz | ............... | E21B 17/07 166/381 |
| 2010/0170261 A1 * | 7/2010 | Stieger | ............... | B64D 33/06 60/771 |
| 2011/0030380 A1 * | 2/2011 | Widdle, Jr. | ............... | F02K 1/10 60/771 |
| 2012/0321456 A1 * | 12/2012 | Calder | ............... | F02K 1/383 415/208.2 |
| 2014/0003916 A1 * | 1/2014 | Dron | ............... | F02K 1/09 415/148 |
| 2014/0207118 A1 * | 7/2014 | Tsoukalis | ............... | A61M 39/14 604/535 |
| 2017/0298758 A1 * | 10/2017 | Mears | ............... | F01D 9/041 |

OTHER PUBLICATIONS

Notification of Transmittal of the International Preliminary Report on Patentability dated Jan. 13, 2009 for PCT/US2006/040067.

* cited by examiner

VARIABLE FAN NOZZLE USING SHAPE MEMORY MATERIAL

CROSS-REFERENCE TO RELATED APPLICATION

This application is a continuation of U.S. application Ser. No. 12/442,547, filed Mar. 24, 2009, which is the US national phase of PCT/US2006/040067, filed Oct. 12, 2006.

BACKGROUND OF THE INVENTION

This invention relates to gas turbine engines and, more particularly, to a gas turbine engine having a variable fan nozzle for controlling a bypass airflow through a fan bypass passage of the gas turbine engine.

Gas turbine engines are widely known and used for power generation and vehicle (e.g., aircraft) propulsion. A typical gas turbine engine includes a compression section, a combustion section, and a turbine section that utilize a core airflow into the engine to propel the vehicle. The gas turbine engine is typically mounted within a housing, such as a nacelle. A bypass airflow flows through a passage between the housing and the engine and exits from the engine at an outlet.

Presently, conventional gas turbine engines are designed to operate within a desired performance envelope under certain predetermined flight conditions, such as cruise. Conventional engines tend to approach or exceed the boundaries of the desired performance envelope under flight conditions outside of cruise, such as take-off and landing, which may undesirably lead to less efficient engine operation. For example, the size of the fan and the ratio of the bypass airflow to the core airflow are designed to maintain a desired pressure ratio across the fan during cruise. However, during take-off and landing, the pressure ratio may change such that pressure pulsations occur across the fan (i.e., fan flutter). The pressure pulsations cause less efficient fan operation and increase mechanical stress on the fan, which ultimately causes an increase in fuel consumption and reduces the life expectancy of the fan.

Therefore, there is a need to control the bypass airflow over a wider variety of different flight conditions, such as take-off and lift-off, to enable enhanced control of engine operation.

SUMMARY OF THE INVENTION

An example gas turbine engine includes a fan, a nacelle arranged about the fan, and an engine core at least partially within the nacelle. A fan bypass passage downstream of the fan between the nacelle and the gas turbine engine conveys a bypass airflow from the fan. A nozzle associated with the fan bypass passage is operative to control the bypass airflow. The nozzle includes a shape memory material having a first solid state phase that corresponds to a first nozzle position and a second solid state phase that corresponds to a second nozzle position. The shape memory material is thermally active. A controller controls an actuator near the nozzle selectively heats and cools the nozzle to reversibly transition the shape memory material between the phases to move the nozzle between the positions.

In one example, the nozzle includes triangular-shaped tabs that extend from the nacelle. The controller selectively axially extends and retracts the tabs to change an effective area of the nozzle. In another example, the controller selectively moves the tabs in a radial direction to change the effective area.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION

Figure 1:
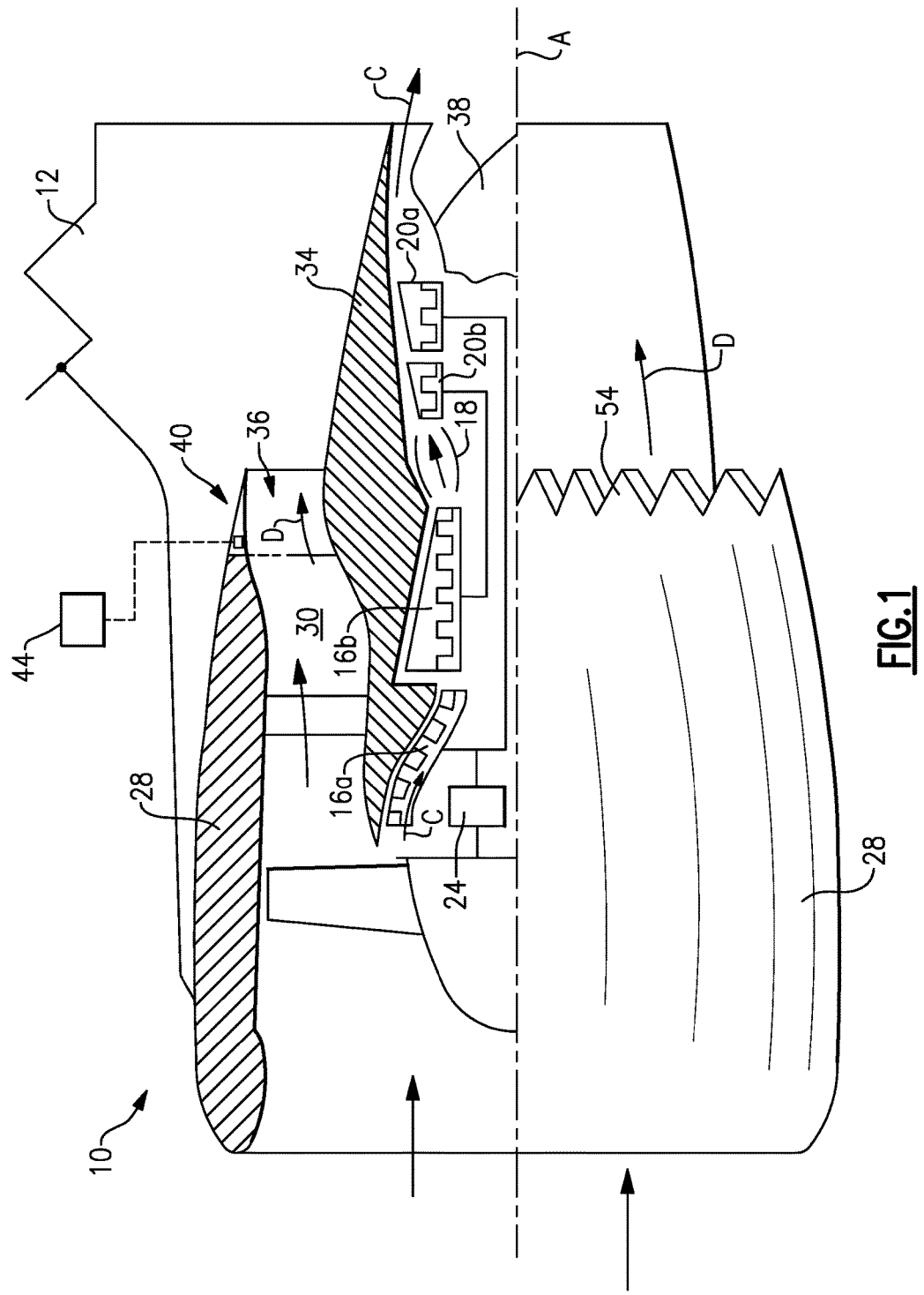
FIG. 1 illustrates selected portions of an example gas turbine engine system with a nozzle having shape memory material.

FIG. 1 illustrates a schematic view of selected portions of an example gas turbine engine 10 suspended from an engine pylon 12 of an aircraft, as is typical of an aircraft designed for subsonic operation. The gas turbine engine 10 is circumferentially disposed about an engine centerline, or axial centerline axis A. The gas turbine engine 10 includes a fan 14, a low pressure compressor 16a, a high pressure compressor 16b, a combustion section 18, a low pressure turbine 20a, and a high pressure turbine 20b. As is well known in the art, air compressed in the compressors 16a, 16b is mixed with fuel that is burned in the combustion section 18 and expanded in the turbines 20a and 20b. The turbines 20a and 20b are coupled for rotation with, respectively, rotors 22a and 22b (e.g., spools) to rotationally drive the compressors 16a, 16b and the fan 14 in response to the expansion. In this example, the rotor 22a also drives the fan 14 through a gear train 24.

In the example shown, the gas turbine engine 10 is a high bypass turbofan arrangement. In one example, the bypass ratio is greater than 10, and the fan 14 diameter is substantially larger than the diameter of the low pressure compressor 16a. The low pressure turbine 20a has a pressure ratio that is greater than 5, in one example. The gear train 24 can be any known suitable gear system, such as a planetary gear system with orbiting planet gears, planetary system with non-orbiting planet gears, or other type of gear system. In the disclosed example, the gear train 24 has a constant gear ratio. Given this description, one of ordinary skill in the art will recognize that the above parameters are only exemplary and that other parameters may be used to meet the particular needs of an implementation.

An outer housing, nacelle 28, (also commonly referred to as a fan nacelle or outer cowl) extends circumferentially about the fan 14. A generally annular fan bypass passage 30 extends between the nacelle 28 and an inner housing, inner cowl 34, which generally surrounds the compressors 16a, 16b and turbines 20a, 20b.

In operation, the fan 14 draws air into the gas turbine engine 10 as a core flow, C, and into the bypass passage 30 as a bypass air flow, D. In one example, approximately 80 percent of the airflow entering the nacelle 28 becomes bypass airflow D. A rear exhaust 36 discharges the bypass air flow D from the gas turbine engine 10. The core flow C is discharged from a passage between the inner cowl 34 and a tail cone 38. A significant amount of thrust may be provided by the discharge flow due to the high bypass ratio.

The example gas turbine engine 10 shown FIG. 1 also includes a nozzle 40 (shown schematically) associated with the bypass passage 30. In this example, the nozzle 40 is shown near the rear of the nacelle 28, however, in other examples, the nozzle 40 is located farther forward but aft of the fan 14. In this example, the nozzle 40 is coupled to the nacelle 28. Alternatively, the nozzle 40 is coupled with the inner cowl 34, or other suitable structural portion of the gas turbine engine 10.

The nozzle 40 is operative to move between a plurality of positions to influence the bypass air flow D, such as to manipulate an air pressure of the bypass air flow D. A controller 44 commands the nozzle 40 to selectively move among the plurality of positions to manipulate the bypass air flow D in a desired manner. The controller 44 may be dedicated to controlling the nozzle 40, integrated into an existing engine controller within the gas turbine engine 10, or be incorporated with other known aircraft or engine controls. For example, selective movement of the nozzle 40 permits the controller 44 to vary the amount and direction of thrust provided, enhance conditions for aircraft control, enhance conditions for operation of the fan 14, or enhance conditions for operation of other components associated with the bypass passage 30, depending on input parameters into the controller 44.

In one example, the gas turbine engine 10 is designed to operate within a desired performance envelope under certain predetermined conditions, such as cruise. For example, the fan 14 is designed for a particular flight condition—typically cruise at 0.8 Mach and 35,000 feet. The fan 14 is designed at a particular fixed stagger angle for an efficient cruise condition. The nozzle 40 is operated to influence the bypass airflow D such that the angle of attack or incidence on the fan 14 is maintained close to design incidence at other flight conditions, such as landing and takeoff, thus enabling a desired engine operation over a range of flight condition with respect to performance and other operational parameters such as noise levels. In one example, it is desirable to operate the fan 14 under a desired pressure ratio range (i.e., the ratio of air pressure forward of the fan 14 to air pressure aft of the fan 14) to avoid fan flutter. To maintain this range, the nozzle 40 is used to influence the bypass airflow D to control the air pressure aft of the fan 14 and thereby control the pressure ratio. In some examples, the nozzle 40 varies an effective area associated with the nozzle 40 by approximately 20% to influence the bypass airflow D.

Figure 2:
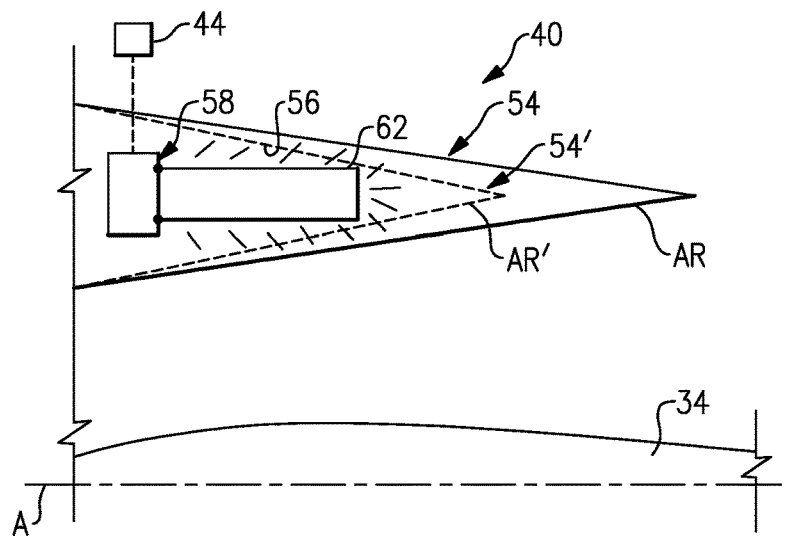
FIG. 2 schematically illustrates an example tab of the nozzle, wherein the tab is axially moveable.
Figure 3:
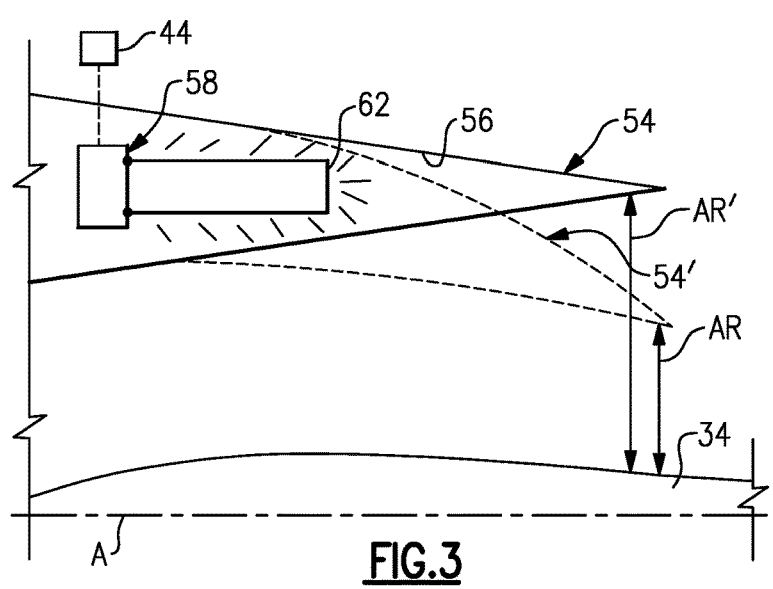
FIG. 3 schematically illustrates an example tab of the nozzle, wherein the tab is radially moveable.

In the illustrated example, the nozzle 40 includes tabs 54 that extend in a generally axial direction from the nacelle 28. Referring to FIG. 2, each of the tabs 54 is generally triangular-shaped and tapers in a radial thickness from the forward end to the trailing end. It is to be understood that the designed shape of the tabs 54 can vary from the illustrated example. One benefit associated with using the tabs 54 is noise reduction due to mixing of the exiting bypass airflow D with the surrounding outer airflow.

Each of the tabs 54 in this example is a hollow section that defines an internal cavity 56. The internal cavity 56 tapers with the taper of the walls of the tab 54. An actuator 58 is mounted within the internal cavity 56 in a known manner. Alternatively, the actuator 58 is mounted outside of the internal cavity 56 within the nacelle 28 or other portion of the engine 10.

The tabs 54 are made of a shape memory material ("SMM") that permits the tabs 54 to move between a plurality of different positions for controlling the effective area of the nozzle 40 to thereby influence the bypass airflow D. In one example, the SMM is thermally active and changes shape in response to a change in temperature. In this example, the controller 44 selectively activates the actuator 58 to move the tabs 54 using radiant heat. The tabs 54 move in response to the amount of heat relative to a threshold temperature associated with the SMM. By controlling the amount of heat, the controller 44 is able to control the position of the tabs 54 to obtain a desired effective area.

In the illustrated example, the actuator 58 includes a control unit 60 that is connected to the controller 44 and a wire 62 that forms a loop within the internal cavity 56. The control unit 60 is operative to transmit an electric current through the wires 62 to thereby resistively heat the wire 62 and produce heat that radiates throughout the internal cavity 56. The wire 62 alternatively includes multiple loops that form a heating mesh to uniformly heat the tab 54. Each tab 54 may includes its own actuator 58. Alternatively, a single actuator 58 heats one or more wires 62 that extend through multiple internal cavities 56.

The controller 44 selectively actives the actuators 58 to move the tabs 54. In a closed, extended position designated by the solid line of the tab 54 (FIG. 2), the nozzle 40 has an associated effective area, AR. In an open, retracted position designated by the dashed line of the tab 54', the nozzle 40 has an associated effective area, AR'. Thus, in this example, moving the nozzle 40 between the closed and open position changes the effective area by an amount proportional to the difference between AR and AR'. In this example, the difference is proportional to the change in axial length of the tab 54.

In another example, the tabs 54 move in a radial direction rather than the axial direction. In an open position designated by the solid line of the tab 54, the nozzle 40 has an associated effective area, AR. In a closed position designated by the dashed line of the tab 54', the nozzle 40 has an associated effective area, AR'. Thus, in this example, moving the nozzle 40 between the closed and open position changes the effective area by an amount approximately proportional to the change in radial distance between the tab 54 and the inner cowl 34. As can be appreciated, the tab 54 may also move axially and radially for a change in the effective area.

In the above examples, the controller 44 selectively commands the tabs 54 to move in order to obtain a desired effective area for controlling the air pressure of the bypass airflow D within the bypass passage 30. For example, closing the nozzle 40 (AR in the above example) restricts the bypass airflow D and produces a pressure build-up (i.e., an increase in air pressure) within the bypass passage 30. Inversely, opening the nozzle 40 (AR' in the above examples) permits more bypass airflow D and reduces the pressure build-up (i.e., a decrease in air pressure). As described above, controlling the bypass airflow provides numerous benefits associated with the fan 14, engine thrust, etc.

In one example, the SMM is characterized as being reversibly changeable between a first solid state phase that corresponds to one of the nozzle 40 positions and a second solid state phase that corresponds to another of the nozzle 40 positions. The phases represent different crystallographic arrangements of the atomic elements of the SMM. In one example, the SMM transitions between the phases relative to a threshold temperature (e.g., a temperature range in some examples) such that above the threshold temperature the SMM transitions into one of the phases and below the threshold temperature the SMM transitions into the other phase.

The SMM is "trained" in a known manner by heating and deforming the SMM such that the two phases "remember" the shape of the tab 54 that is associated with that phase. Thus, the controller 44 selectively heats the tabs 54 using the actuators 58 or cools the tabs 54 by shutting off the actuators 58 (permitting the surrounding airflow to cool the tabs 54) to transition the SMM between the phases and thereby move the tabs 54 between the different positions.

Figure 4:
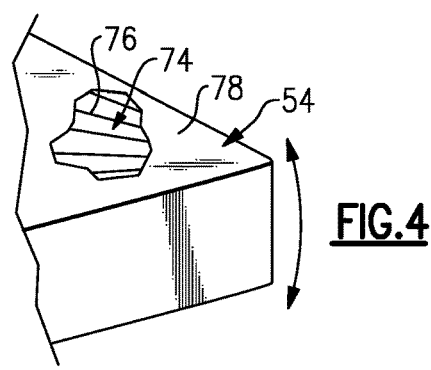
FIG. 4 schematically illustrates an example tab of the nozzle, having a wire frame made of shape memory material.

FIG. 4 illustrates another embodiment of an example tab 54. In this example, the tab 54 is made from a non-continuous sheet made of SMM instead of continuous sheets as in the above example. In the illustrated example, the non-continuous sheet includes wire frame 74 having wires 76 that are made of the SMM. The wire frame 74 supports a flexible skin 78 that generally moves with the wires 76 between the different positions to influence the bypass airflow D. Given this description, one of ordinary skill in the art will recognize suitable types of flexible skin 78 to meet their particular needs.

In one example, the smart memory material of the above examples is a nickel-titanium alloy, and the two phases are austenite and martensite. Other example thermally active SMM's include certain copper alloys, nickel alloys, cobalt alloys, manganese alloys, copper-aluminum alloys, copper-zinc-aluminum alloys, and combinations thereof. Generally, one or more of the example thermally active SMM's are known as having shape memory characteristics over a temperature range of approximately −150° C. to 200° C. Additionally, temperature changes of between about 2° C. to 20° C. about the threshold temperature of one or more of the example SMM's are enough to transition between phases, which provides the benefit of not having to heat or cool the tabs 54 over a large temperature range to change nozzle 40 positions.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A gas turbine engine comprising:
a fan;
a nacelle arranged about the fan;
an engine core at least partially within the nacelle, the engine core having a compressor and a turbine;
a fan bypass passage downstream of the fan between the nacelle and the engine core, for conveying a bypass airflow from the fan;
a nozzle section for controlling the bypass airflow, wherein the nozzle section includes a shape memory material having a first solid state phase that corresponds to a first nozzle position and a second solid state phase that corresponds to a second nozzle position;
the nozzle section includes tabs that include the shape memory material;
the tabs extend from the nacelle in a generally axial direction relative to an axis of rotation of the fan;
wherein the tabs taper in a radial thickness from a forward end toward a trailing end; and
wherein the nozzle section includes a hollow section made of shape memory material, the hollow section defining a cavity therein and further comprising an actuator at least partially within the cavity.

2. The gas turbine engine recited in claim 1, wherein the actuator includes a heater having a heating element that includes wires that are operative to radiantly heat the hollow section.

* * * * *